Sept. 4, 1962
C. G. GORDON
3,052,263
HYDRAULIC SERVO VALVES
Filed Sept. 13, 1960
4 Sheets-Sheet 1
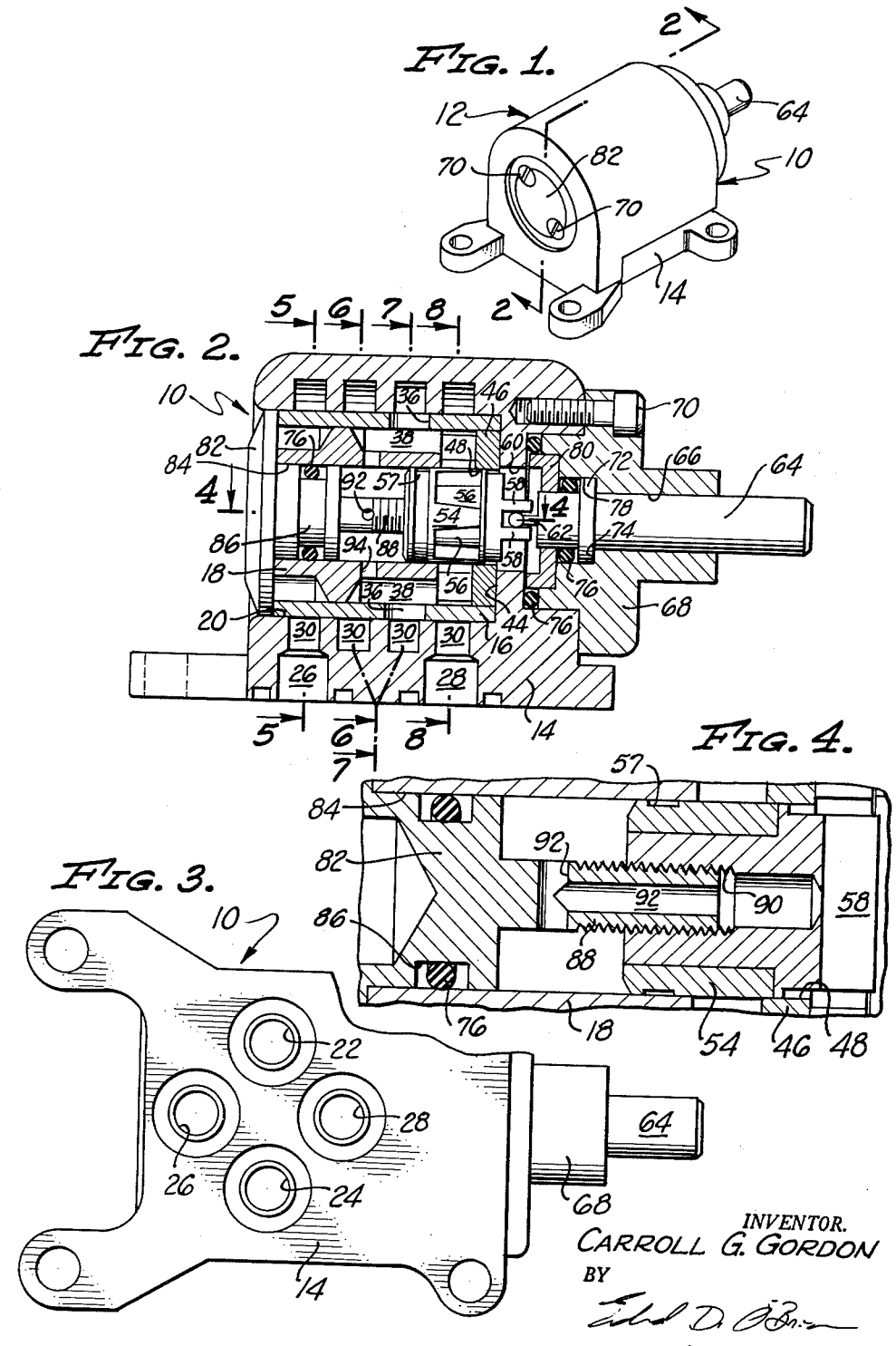
INVENTOR.
CARROLL G. GORDON
BY
*Edward D. O'Brien*
ATTORNEY Sept. 4, 1962  C. G. GORDON  3,052,263
HYDRAULIC SERVO VALVES
Filed Sept. 13, 1960  4 Sheets-Sheet 2

INVENTOR.
CARROLL G. GORDON
BY
*Edwd D. O'Brien*
ATTORNEY

Sept. 4, 1962
C. G. GORDON
3,052,263
HYDRAULIC SERVO VALVES
Filed Sept. 13, 1960
4 Sheets-Sheet 3
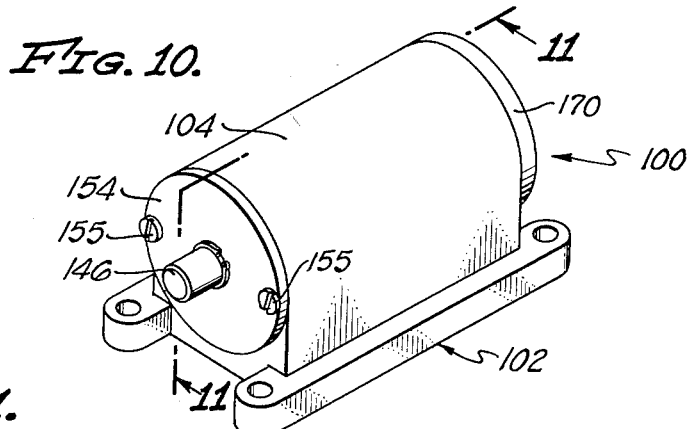
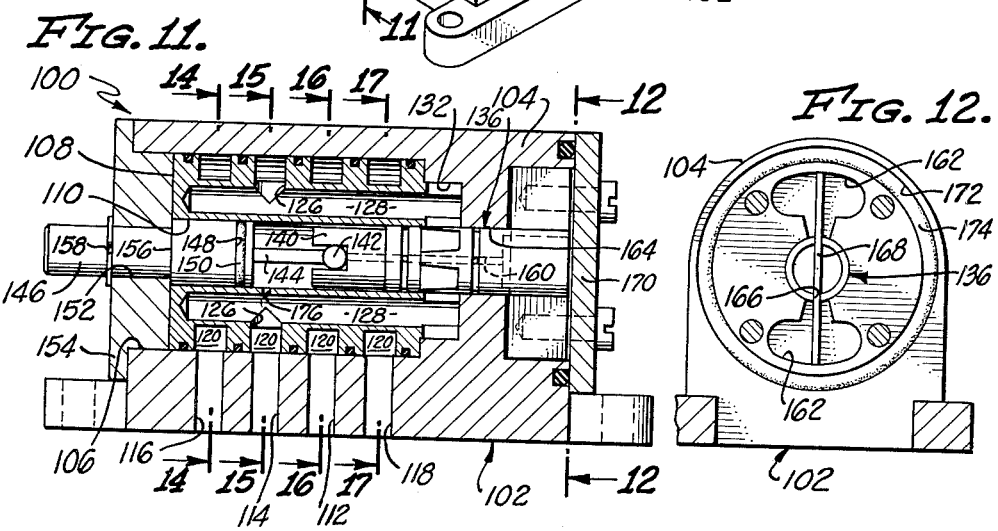
INVENTOR.
CARROLL G. GORDON
BY
ATTORNEY

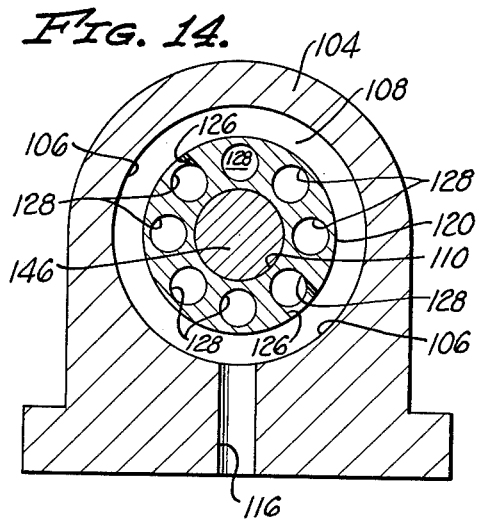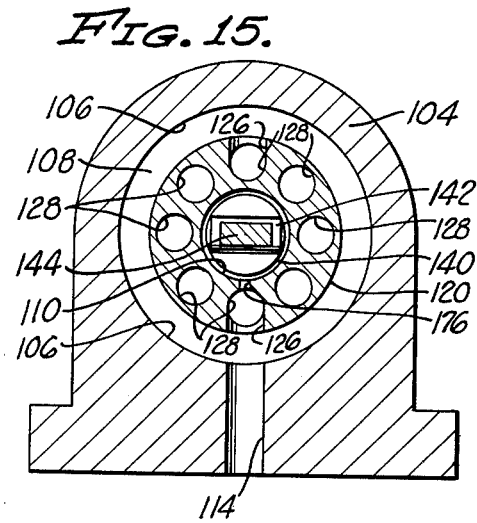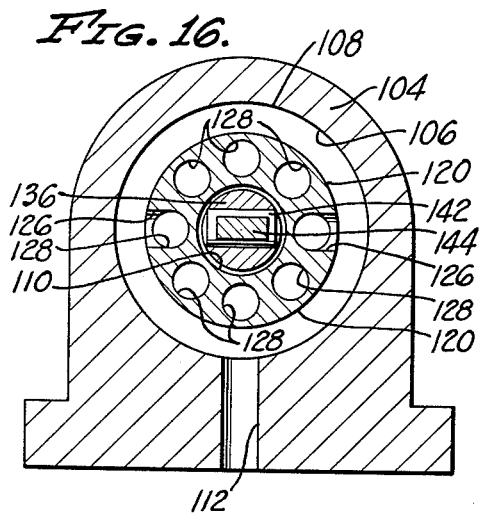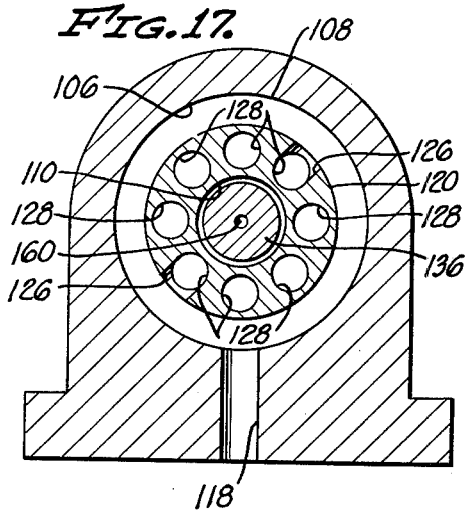

United States Patent Office 3,052,263
Patented Sept. 4, 1962

3,052,263
HYDRAULIC SERVO VALVES
Carroll G. Gordon, 3 Williams Court, Menlo Park, Calif.
Filed Sept. 13, 1960, Ser. No. 55,653
7 Claims. (Cl. 137—624)

This invention pertains to new and improved hydraulic servo valves.

Many thousands of different types of valves are, of course, known at the present time. In spite of the fact that a great deal of work of a development nature has been performed in the field of valves, there still remains in this field a definite need for certain types of valve structure. This need is especially evident in the field of servo valves.

Servo valves as a class are used primarily in controlling the operation of various types of hydraulic structures such as, for example, hydraulic cylinders and the like in response to either mechanical action or an electrical signal. Because of the nature of this type of valve, servo valves are constantly subjected to hydraulic pressure from a suitable source of hydraulic fluid, and are normally constantly connected to a return conduit for returning hydraulic fluid for reuse.

Present day requirements for servo valves for use in missiles and the like are, in many cases, very difficult to meet. In the aircraft field the fluid pressures which controlled through the use of servo valves have constantly been increased. At the present time valves for use at pressures from about 4,000 to 5,000 p.s.i. are in definite demand. New developments presently in the design or development stages frequently are of such a character that it is, or will be desirable to utilize with such projects hydraulic pressures of up to 8,000–10,000 p.s.i. or even greater. Further, the vast majority of applications for servo valves are of a "critical" nature as far as weight requirements are concerned. For these applications it is necessary to use valves which are as light in weight as physically possible.

Common servo valves for "critical uses" are of a spool type. Valves of this type employ a valve spool or cylinder which is moved or controlled through the application of hydraulic pressures to the ends of this body. This type of valve is not considered acceptable for use at extreme pressures by some authorities, although many such valves are now used for many applications where high pressures are encountered. Such valves, normally are not constructed so that their operation may be directly controlled by some sort of a mechanical structure.

Spool type valves as briefly indicated above, as well as many rotary valves in the servo valve field tend to be unacceptable for use at high pressures because of the problems created by the forces encountered at such pressures. Pressures of from 4,000–10,000 p.s.i. will tend to bend parts which because of weight considerations must be made comparatively small and light in weight in most servo valves. Whenever such bending occurs valve malfunctioning is the expected consequence. As a result of this there is a need for valves which are of a "balanced" variety so that extreme hydraulic pressures do not result in malfunctioning such as might be caused by bending.

An object of the present invention is to answer this need and to provide new and improved hydraulic servo valves which are capable of being satisfactorily used at high or extreme pressures. A further object is to provide valves of this type which are designed so as to be made comparatively light in weight. Another object of the present invention is to provide rotary valves as indicated which will perform reliably and satisfactorily under virtually all conditions, and which may be inexpensively and conveniently made using existing equipment, processes, etc.

These and various other objects of this invention as well as many specific advantages of it will be more fully apparent to those skilled in the art to which the invention pertains from a detailed consideration of the remainder of this specification including the appended claims and the accompanying drawings in which:

FIG. 1 is a perspective view of a hydraulic servo valve of this invention;

FIG. 2 is a cross-sectional view taken at line 2—2 of FIG. 1;

FIG. 3 is a bottom plan view of this servo valve;

FIG. 4 is a cross-sectional view taken at line 4—4 of FIG. 2;

FIG. 10 is a perspective view of a modified hydraulic servo valve of this invention;

FIG. 11 is a cross-sectional view taken at line 11—11 of FIG. 10;

FIG. 12 is a cross-sectional view taken at line 12—12 of FIG. 11;

FIG. 13 is an exploded perspective view similar to FIG. 9 showing various parts employed in the housing in this modified valve;

FIG. 14 is a cross-sectional view taken at line 14—14 of FIG. 11;

FIG. 15 is a cross-sectional view taken at line 15—15 of FIG. 11;

FIG. 16 is a cross-sectional view taken at line 16—16 of FIG. 11; and

FIG. 17 is a cross-sectional view taken at line 17—17 of FIG. 11.

Figure 5:
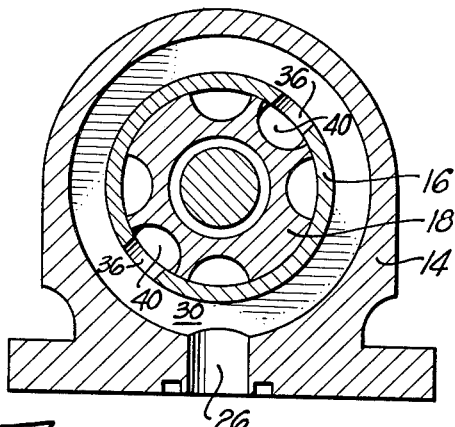
FIG. 5 is a cross-sectional view taken at line 5—5 of FIG. 2.

It is to be understood that the accompanying drawings are primarily intended so as to clearly illustrate two presently preferred embodiments or forms of the present invention. Because of the fact that these drawings are primarily intended for illustrative purposes in certain instances they do not show the precise dimensions, etc., of the various parts employed in the valves illustrated. It will, of course, be realized that valves employing the teachings of the present invention as set forth in this specification can be constructed so as to depart from the precise shapes of the valves shown, and that such modified valves can be easily constructed on the basis of this disclosure through the exercise of routine engineering skill and ability.

As an aid to understanding the invention it can be stated in essentially summary form that it concerns hydraulic servo valves, each of which employs a multi-part housing, the parts of which define a cylindrical rotor cavity and define connecting ports leading to grooves extending around this cavity. These grooves are connected by openings to passages which extend parallel to this cavity, and these passages in turn are connected to a valve plate which contains accurately formed valve openings which lead into the interior of the cavity itself. Within the interior of such a cavity there is located a valve rotor having notches formed in its periphery which correspond in shape to the shape of these valve openings. Further, means are provided for positioning the rotor opposite these openings and for turning the valve rotor so as to connect certain of the valve openings with other valve openings during use of a complete valve as herein described.

The actual nature of the present invention is best more fully explained by referring directly to the accompanying drawings. In drawings there is shown a hydraulic servo valve 10 of the present invention which includes a complete housing 12 consisting of an outer casing 14, a connecting sleeve 16 and a rotor cylinder 18, all of which parts defining the complete housing 12 are secured with respect to one another against relative motion. Preferably the cylindrical sleeve 16 and the rotor cylinder 18 are of such a character that they are located with respect to one another by using a "shrink fit" type of process, although they may also be furnace brazed to one another. For assembly purposes the casing 14 is preferably provided with an internal cylindrical cavity 20 against which the exterior of the sleeve 16 fits, and the rotor cylinder 18 is formed so that its interior fits tightly against the interior of the sleeve 16.

The complete housing 12 is formed so that the bottom of the casing 14 includes ports 22, 24, 26 and 28 which are used in order to connect the complete valve 10 to suitable hydraulic lines for use. Although these ports may be spaced in various desired patterns because of certain standards in the valve field it is normally preferred to space them from one another substantially as shown in FIG. 3 of the drawings, and to supply hydraulic fluid under pressure to the valve 10 through the port 22 and to return "spent" hydraulic fluid to a suitable collecting source (not shown) through the port 24, and to connect the ports 26 and 28 to a suitable hydraulic mechanism (not shown) controlled through the use of this valve 10. Because of the nature of the valve 10 the various ports 22, 24, 26 and 28 may be connected in a different manner than this.

In the valve 10 a series of grooves 30 are located around the interior of the cavity 20 in the casing 14, and each of these grooves is connected to one of the ports, 22, 24, 26 and 28. It will be noted that the number of the grooves 30 corresponds to the number of the ports provided and that these grooves are isolated from one another by means of the sleeve 16 covering them.

The exterior of the rotor cylinder 18 contains a pair of passages 34, each passage of which is connected to one of the grooves 30 by means of a hole 36; it also contains a pair of other passages 38 each passage of which is connected to another of the grooves 30 by means of a hole 36; it also includes a further pair of passages 40, each passage of which is connected to a further one of the grooves 30 by means of a hole 36; it also contains a still further pair of passages 42, each passage of which is connected to the last of the grooves 30 by means of a hole 36.

All of the passages 34, 38, 40 and 42 are parallel to one another. Further, these passages are also spaced equi-distant from one another around the periphery of the exterior of the rotor cylinder 18. With this type of construction the passages 34 are connected to the port 22, the passages 38 are connected to the port 24, the passages 40 are connected to the port 26 and the passages 42 are connected to the port 28. It will be noted that all these pairs of passages are arranged so that those passages within each of the pairs specified are located on opposite sides of the axis of the rotor cylinder 18, and that all of these passages specified are parallel to the axis of this rotor cylinder.

Within the valve 10 preferably the rotor cylinder 18 is not as long as the connecting sleeve 16 so as to provide within the interior of the housing 12 a cylindrical disc-like space (not separately numbered) defined by the interior of part of the sleeve 16, the end of the rotor 18 and a wall 44 located on the casing 14. In the valve 10 this space is occupied by means of a valve plate 46 which is formed so as to have a generally ring-like cylindrical configuration. The interior 48 of this valve plate 46 is, of course, of a cylindrical shape; the diameter of this interior 48 is preferably substantially identical to the diameter of the interior of the rotor cylinder 18 so that the interior 48 of the plate 46 is contiguous with the interior surface of the rotor cylinder 18.

This plate 46 includes a plurality of cut-away portions 50, each of which is aligned with and corresponds to one of the passages 34, 38, 40 and 42. These portions 50 are in communication with the interior 48 of the plate 46 through valve openings 52. These valve openings 52 are preferably of substantially an identical configuration. Further, they are preferably spaced equi-distant from one another at intervals corresponding to 45° of rotation around the axis of the rotor cylinder 18.

Leakage around the plate 46 is preferably prevented by securing it to the casing 14. This may be done in the same ways in which the casing 14, the sleeve 16 and the cylinder 18 may be secured together. When the plate 46 is secured in this manner it forms a part of the housing 12. Preferably the openings 52 are all located in the same plane perpendicular to the axis of the rotor cylinder 18.

This rotor cylinder 18 contains a cylindrical valve rotor 54 which fits closely against the interior 48 of the plate 46 and the interior of the rotor cylinder 18. The rotor 54 includes a plurality of notches 56 which are substantially identically formed and which are preferably spaced equi-distant from one another at intervals corresponding to 90° of rotation around the axis of this rotor 54 and are all located in the same plane perpendicular to the axis of the rotor 54. These notches 56 are so dimensioned that the exterior of the rotor 54 normally covers the openings 52 leading to the passages 40 and 42 in order to prevent the movement of liquid from the other passages 34 and 38 either into or out of the passages 40 or 42. Moreover, the notches 56 in the periphery of the rotor 54 are proportioned so that only a limited amount of rotation of the rotor 54 is necessary in order to place either the passages 34 in communication with the passages 38 in communication with the passages 42 and the passages 38 in communication with the passages 40. It will be realized that this corresponds to supplying hydraulic fluid under pressure to either the port 26 or the port 28 depending upon the direction of rotation when the valve 10 is connected as previously indicated.

In the valve 10 the rotor 54 may contain peripheral grooves 57 which are parallel to one another and to the plane of the notches 56, and which are spaced from these notches and which extend in planes at right angles to the axis of this rotor. These grooves 57 are designed so as to equalize the pressures on the opposite ends of the rotor surface resulting from leakage of hydraulic fluid along the periphery of the rotor 54 from both ends of the notches 56. Preferably the grooves 57 are spaced equi-distant from the ends of the notches 56. With this type of construction the pressure distribution is balanced over the surface areas of the rotor which are in close proximity with one another. Obviously some leakage will always occur from these notches 56 to the grooves 57 because of the fact that it is virtually impossible to manufacture the rotor 54 so that it can be rotated without having it of slightly smaller dimension than the interior of the cavity within which it is located. If desired, holes (not shown) may be located so as to lead within the rotor 54 from the grooves 57 into the hollow interior of this rotor in order to further equalize pressures. The rotor 54 also preferably includes parallel spaced walls 58 which extend from an end of this rotor through an opening 60 in the wall 44. These walls 58 are adapted to receive a projection 62 which extends from an end of an actuating shaft 64.

This shaft 64 is preferably held for rotation in a bearing opening 66 in a cap 68 which may be secured to the casing 14 by means of screws 70. The shaft 64 may be provided with a holding collar 72 which rides against an interior shoulder 74 in the bearing opening 66. A conventional O-ring 76 may be located against this shoulder 74 around the shaft 64 so as to form a seal against the interior of an enlarged extremity 78 of the opening 66. Another similar O-ring 76 may be located between the cap 68 and the casing 14 as shown for sealing purposes. It is also possible to utilize a retainer disc 80 around the shaft 64 in order to cover the O-rings 76 and to hold these O-rings in place.

From the foregoing description it will be realized that the shaft 64 is constructed so that when it rotates the rotor 54 is turned so as to accomplish a valving action, but that this shaft 64 is not connected to the rotor 54 in such a manner as to control the position of the rotor 54 along the direction of its axis with respect to the notches 56.

In the valve 10 such position control is accomplished by using a closure 82 which is attached to the extremity of the housing 12 remote from the shaft 64 by means of other screws 70 engaging the rotor cylinder 18. This closure 82 has a cylindrical body 84, which fits tightly against the interior of the rotor cylinder 18.

Figure 6:
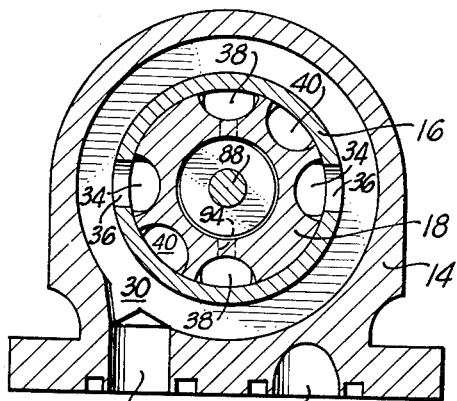
FIG. 6 is a cross-sectional view taken at line 6—6 of FIG. 2.
Figure 7:
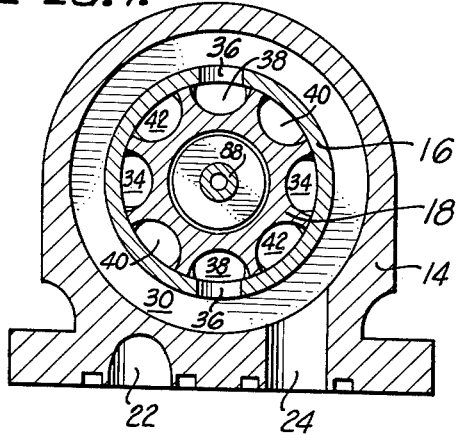
FIG. 7 is a cross-sectional view taken at line 7—7 of FIG. 2.
Figure 8:
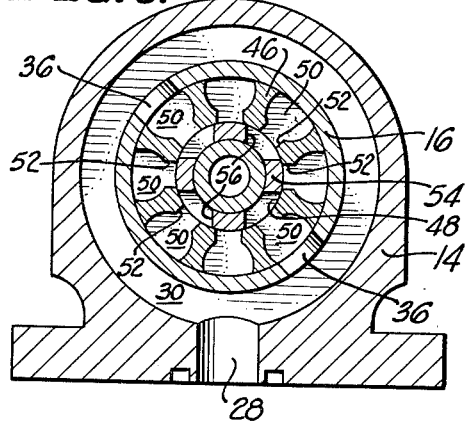
FIG. 8 is a cross-sectional view taken at line 8—8 of FIG. 2.
Figure 9:
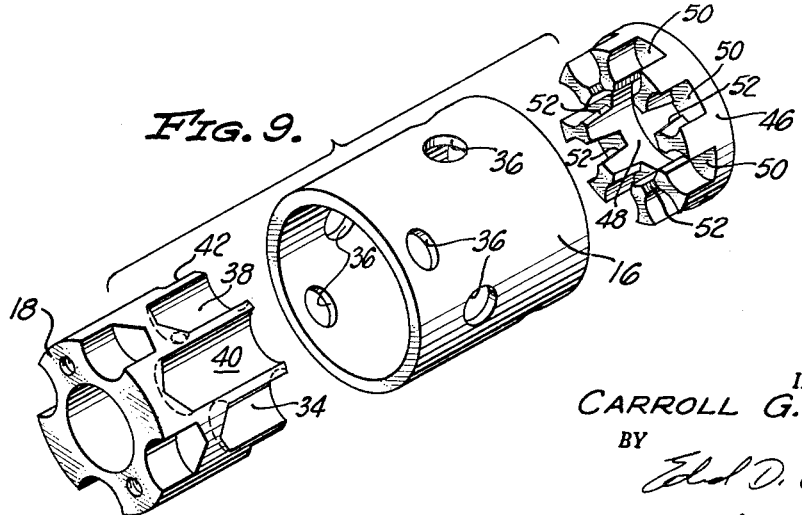
FIG. 9 is an exploded perspective view showing the assembly of certain parts employed in the housing in the valve shown in the preceding figures.

This body 82 carries an externally threaded stud 88 which is axially aligned with the axis of the rotor 54, and which is threaded within a threaded bore 90 extending along the axis of the rotor 54 between its ends. Further connecting passages 92 are formed within the stud 88 so as to place the ends of the rotor 54 in fluid communication with one another. Other openings 94 in the rotor cylinder 18 connect the interior of this rotor cylinder with at least one of the passages 38 as indicated in FIGS. 2 and 6 of the drawings.

This construction is designed so as to accomplish several purposes. It allows any fluid which might leak around the periphery of the rotor 54 to be returned to the return port 24. Also it allows the pressure on both ends of the rotor 54 to be equalized at all times so as to avoid hydraulic forces being exerted on this rotor which might tend to interfere with satisfactory valve operation. This structure also, however, serves another very definite function. It permits adjustment of the relative positions between the closure 82 and the rotor 54 so that the amount of overlap in an axial direction between the notches 56 and the valve openings 52 may be regulated or adjusted so as to permit the valve 10 to operate in a predetermined manner as may be desired so as to create certain specific performance characteristics.

This is considered to be extremely important. Many prior valves of a related character have not included an adjustment feature of this type. As a consequence of this the manufacture of such valves to a given specific rating has tended to be critical, and as a consequence in the manufacture of such valves has tended to be a high percentage of rejects. The structure shown and described with respect to adjustment of the position of the valve rotor 54 permits a valve such as the valve 10 to be adjusted to compensate for manufacturing tolerances without any comparative difficulty.

It will be noted that the rotor 54 in the valve 10 is only turned back and forth a comparatively small arc of a circle during the use of this valve. Hence, during normal use of this valve the relative position in an axial direction of this rotor 54 with respect to the housing 12 is not changed a significant amount. If desired, however, such a relative position may be changed for adjustment purposes by rotating the shaft 64 a number of times.

Preferably the notches 56 and the valve openings 52 are formed as disclosed in the co-pending application, Serial No. 836,504 filed August 27, 1959 entitled, Electro-Hydraulic Servo Valves so that these parts of the valve 10, when laid out in a planar configuration, all have the shapes of identically dimensioned isosceles trapezoids with the shorter of the parallel sides of the trapezoids being located adjacent to one another. This type of construction is also considered important so that the rotor may be rotated through successive positions at angles of 45° around its axis from one null position to another. This enables a person adjusting the valve 10 so as to achieve desired performance characteristics to select the best rotor position to balance out small edge irregularities in the notches 56 and the valve openings 52. Such irregularities will inherently occur because of the character of the forming operations which must be employed in creating the various parts specified. Further, the isosceles trapezoidal shapes herein specified enable the valve 10 to be adjusted for leakage in null or neutral positions and enable adjustment so as to improve the linearity of response during rotation of the shaft 64. The amount of overlap between the valve openings 52 and the notches 56 may be regulated as desired with this type of construction.

In FIGURES 10 through 17 in the drawing there is shown a modified servo valve 100 of the present invention. This valve 100 includes a complete housing 102 composed of an outer casing 104 having a cylindrical interior cavity 106 within which there is positioned a connecting cylindrical sleeve 108. This sleeve 108 also has a cylindrical interior cavity 110 which serves as a rotor cavity in this valve. The casing 104 is provided with a pressure port 112, a return port 114 and with service or supply ports 116 and 118. Each of these ports leads to a peripheral groove 120 formed in the exterior of the sleeve 108 so as to face the interior of the cavity 106. If desired the sleeve 108 may be provided with a series of small exterior grooves 122 each of which is adapted to hold a common elastomeric O-ring 124. With this type of construction the O-rings 124 effectively seal the grooves 120 from one another. If desired, however, these grooves 122 and the O-rings 124 may be omitted, and the sleeve 108 may be directly sealed to the casing 104 by furnace brazing or other similar techniques.

Each of the grooves 120 is connected by means of holes 126 to two passages 128 which are located so as to extend axially with respect to the sleeve 108 on diametrically opposed sides of the axis of this sleeve. Thus, by this construction a "balanced" type of fluid distribution within the housing 102 is achieved which is essentially the same as the distribution of hydraulic fluid in the valve 10. Each of the passages 128 leads to a small ring-like boss 130 which, in the valve 100, takes the place of the valve plate 46 previously described in connection with valve 10. This boss 130 fits closely against the interior of a cylindrical extension 132 from the cavity 106 within the casing 104. It preferably includes trapezoidally shaped valve openings 133 of the same type as the valve openings 52 previously indicated. Each of these valve openings 133 is located substantially opposite a similarly shaped notch 134 in a cylindrical valve rotor 136. These notches 134 correspond to the notches 56 previously described and are preferably formed in substantially the same manner as them.

This rotor 136 corresponds to the rotor 56 previously described. It includes peripheral grooves 138 which correspond to the grooves 57 and which are constructed in substantially the same manner as these grooves. The rotor 136 is, of course, rotatably mounted within and fits closely within the cavity 110. It is provided with a bifurcated end 140 located within the sleeve 108. This end 140 is adapted to receive an enlarged extremity 142 on a rod 144 which extends from an actuating shaft 146 mounted so as to extend into the cavity 110. Preferably a groove 148 on the shaft 146 holds an elastomeric O-ring 150 so as to form a seal with respect to the interior of the cavity 110. The shaft 146 extends through an opening 152 in an end cap 154 which is mounted by screws 155 upon the casing 104 so as to seal an extremity of the housing 102. Undesired movement of the shaft 146 is preferably prevented by means of a shoulder 156 on this shaft which fits against the cap 146. A small snap ring 158 engaging the shaft 146 serves to hold this shoulder 156 in place against the cap 154.

In the valve 100 a passage 160 is provided which extends between the ends of the rotor 136. Also within this valve the casing 104 is preferably, but not necessarily, formed so as to include identical kidney shaped dash-pot-like chambers 162 which extend away from a cylindrical extension 164 formed in the casing 104 so as to extend axially from the cavity 110. The rotor 136 projects into this extension 164 as illustrated in the drawing; it is provided with terminal slots 166 which hold a small flat plate-like piston 168 so that this plate 168 extends into the chambers 162 and is capable of being moved within these chambers as the rotor 136 is rotated. The plate 168 is normally held in place by means of another end cap 170 which is secured to the casing 104. Preferably a groove 172 holding an elastomeric O-ring 174 is utilized in order to form a seal with respect to this other end cap 170.

The operation of the modified valve 100 is the same as the operation of the valve 10 previously described. As it is utilized some hydraulic fluid will be conveyed through the rotor 136 to the chambers 162. Because of the presence of such fluid the plate 168 will exert a "controlling" dash-pot effect as far as undesired "sharp" movement of the rotor 136 is concerned. In order to achieve this type of action with the use of the plate 168 in the chambers 162 the plate 168 must, of course, be formed so that only a restricted amount of leakage around it can occur during rotation of the rotor 136. In the valve 100 the hydraulic fluid conveyed to the pressure port 112 which enters the interior of this valve as by leakage is conveyed back to the return port 114 by means of a small hole 176 in the sleeve 108 which leads to the passage 128 which in turn is connected to the groove 120 leading to the return port 114.

Those skilled in the art to which this invention pertains will realize that valves such as the valves 10 and 100 herein shown and described may be easily and conveniently manufactured so as to achieve what, in effect, are considered to be optimum performance characteristics with a minimum of difficulty. They will also realize that valves as herein described may be used with hydraulic fluids at extremely elevated pressures since they are of a "balanced" character as far as the valving action achieved in them is concerned, and inasmuch as they are constructed so that the various parts of them will not tend to be bent or deformed by hydraulic fluid under such extreme pressures. It will be further realized that valves as herein described can perform reliably over prolonged periods, and that they can be adjusted so as to achieve satisfactory performance characteristics. All of these advantages and characteristics can be achieved in accordance with this invention in complete valve structures which may be constructed as shown so as to be comparatively light in weight.

Because of the nature of this invention, it will be considered as being limited only by the appended claims forming a part of this disclosure. This specification is related to the co-pending application Serial No. 766,168 filed September 29, 1958 entitled, Electro-Hydraulic Servo Valves now Patent No. 2,961,002, and the co-pending application Serial No. 836,504, filed August 27, 1959, entitled, Electro-Hydraulic Servo Valves; the disclosures of these two applications are incorporated herein by reference.

I claim:

1. A valve which includes: a valve body having an internal cylindrical cavity formed therein and having a plurality of passages leading into the interior of said cavity, the ends of said passages leading into the interior of said cavity being spaced from one another and each having the shape of an isosceles trapezoid, the parallel sides of which are located at a right angle to the axis of said cavity; and a cylindrical valve rotor rotatably mounted within said cavity, said rotor fitting closely against the interior of said cavity and having notch means formed therein capable of connecting certain of said passages with other of said passages when said valve rotor is turned, the edges of each of said notch means having the shape of an isosceles trapezoid having the same angles between the sides thereof as said ends of said passages, said edges of said notch means being located so that the parallel sides thereof are perpendicular to the axis of said cavity and so that the larger of the parallel sides thereof are adjacent to the smaller of the parallel sides of said ends of said passages.

2. A valve which includes: a valve body having an internal cylindrical cavity formed therein and having a plurality of passages leading into the interior of said cavity, the ends of said passages leading into the interior of said cavity being spaced from one another and each having the shape of an isosceles trapezoid, the parallel sides of which are located at a right angle to the axis of said cavity; a cylindrical valve rotor rotatably mounted within said cavity, said rotor fitting closely against the interior of said cavity and having notch means formed therein capable of connecting certain of said passages with other of said passages when said valve rotor is turned, the edges of each of said notch means having the shape of an isosceles trapezoid having the same angles between the sides thereof as said ends of said passages, said edges of said notch means being located so that the parallel sides thereof are perpendicular to the axis of said cavity and so that the larger of the parallel sides thereof are adjacent to the smaller of the parallel sides of said ends of said passages; and means for adjusting the position of said valve rotor along the axis of said cavity.

3. A valve which includes: a valve body having an internal cavity formed therein and having a pair of pressure passages leading into the interior of said cavity, a pair of rotor passages leading into the interior of said cavity, and two pairs of service passages leading into the interior of said cavity, the ends of said pressure pipes leading into the interior of said cavity being of the same dimension and being located on opposite sides of the axis of said cavity, the ends of said return passages leading into said cavity being of the same dimension and being located on opposite sides of the axis of said cavity so as to be displaced 90° around the axis of said cavity from the ends of said pressure passages, the ends of said service passages being of the same size and being located so that an end of one of said service passages is located between an end of one of said pressure passages and an end of one of said return passages so as to be equally spaced from said pressure and return passages, the end of each of said passages having the shape of an isosceles trapezoid, the parallel sides of which are located at a right angle to the axis of said cavity, the larger of the parallel sides of said ends of said passages being located within the same plane, the smaller of the parallel sides of said ends of said passages being located within the same plane; a valve rotor mounted within said cavity, said valve rotor fitting closely within the interior of said cavity and having notch means formed therein normally located opposite said ends of said pressure passages and said return passages so that said valve rotor closes said ends of said service passages, said valve rotor being capable of being rotated so as to place said pressure passages in communication with a pair of said service passages and said return passages in communication with other of said service passages, the edges of each of said notch means having the shape of an isosceles trapezoid having the same angles between the sides thereof as said ends of said passages, said edges of said notch means being located so that the parallel sides thereof are perpendicular to the axis of said cavity and so that the larger of the parallel sides thereof are adjacent to the smaller of the parallel sides of said ends of said passages.

4. A hydraulic servo valve which includes: a housing having a cylindrical rotor cavity located therein and a cylindrical shaft opening extending axially from one end of said rotor cavity, said housing also including a plurality of pairs of longitudinal passages, each of said passages extending parallel to the axis of said rotor cavity, said passages of each of said pairs being located on opposite sides of the axis of said cavity, a groove corresponding to each of said pairs of passages, said grooves being located within said housing around said passages, each of said grooves being connected to both of said passages of the pair of passages to which it corresponds, port means leading into said grooves, said housing also including a plurality of valve openings, each of said valve openings being in communication with one of said passages and leading into the interior of said rotor cavity, said valve openings being disposed within the same plane transverse to the axis of said rotor cavity; a cylindrical valve rotor fitting closely within the interior of said rotor cavity, said rotor including a plurality of notch means located in the periphery thereof, each of said notch means corresponding to one of said valve openings; shaft means extending into the interior of said rotor cavity through said shaft opening; and connecting means operatively connecting said shaft means with said valve rotor so as to permit rotation of said valve rotor in order to move said notches with respect to said valve openings; means for adjusting the axial position of said rotor in said rotor cavity so as to change the position of said notch means with respect to said valve openings.

5. A hydraulic servo valve as defined in claim 4 wherein said housing includes an outer casing having a cylindrical interior cavity formed therein and a connecting cylindrical sleeve fitting within said cylindrical cavity, and wherein said port means are located within said outer casing and wherein said passages and said grooves are located within said cylindrical sleeve.

6. A hydraulic servo valve as defined in claim 5 including sealing means held between said sleeve and said casing, said sealing means serving to prevent the flow of hydraulic fluid between said sleeve and said casing and between said grooves.

7. A hydraulic servo valve as defined in claim 4 wherein said housing includes an outer casing, a connecting sleeve located within said casing, and a rotor cylinder located within said connecting sleeve and wherein said outer casing, said connecting sleeve and said rotor cylinder are secured to one another against hydraulic leakage, and wherein said grooves are located on the interior of said outer casing, and wherein said passages are located on the exterior of said rotor cylinder and including holes in said sleeve connecting each of said passages with one of said grooves.

References Cited in the file of this patent
UNITED STATES PATENTS

| | | |
|---|---|---|
| 2,312,941 | Tucker | Mar. 2, 1943 |
| 2,749,941 | Gardner | June 12, 1956 |
| 2,843,149 | Peters | July 15, 1958 |
| 2,907,349 | White | Oct. 6, 1959 |
| 2,980,138 | Detweiler et al. | Apr. 18, 1961 |